United States Patent

Ash et al.

[11] Patent Number: 6,158,399
[45] Date of Patent: Dec. 12, 2000

[54] TURBOCHARGED ENGINE COOLING SYSTEM WITH TWO-PASS RADIATOR

[75] Inventors: Michael D. Ash, Washington; Michael D. Betz, Knoxville; Ronald L. Dupree, Washington, all of Ill.

[73] Assignee: Caterpillar Inc., Peoria, Ill.

[21] Appl. No.: 09/187,381

[22] Filed: Nov. 6, 1998

[51] Int. Cl.[7] ........................................ F01P 1/06
[52] U.S. Cl. ........................ 123/41.31; 123/41.54; 123/563; 123/41.29
[58] Field of Search ................. 123/41.01, 41.31, 123/41.29, 41.54, 563

[56] References Cited

U.S. PATENT DOCUMENTS

| | | | |
|---|---|---|---|
| 3,080,857 | 3/1963 | Middendorf | 123/41.1 |
| 3,134,371 | 5/1964 | Crooks | 123/41.31 |
| 3,425,400 | 2/1969 | Scherenberg | 123/41.08 |
| 3,439,657 | 4/1969 | Gratzmuller | 123/41.31 |
| 3,863,612 | 2/1975 | Wiener | 123/41.08 |
| 3,872,835 | 3/1975 | Deutschmann | 123/41.31 |
| 4,325,219 | 4/1982 | Stang et al. | 60/599 |
| 4,348,991 | 9/1982 | Stang et al. | 123/41.29 |
| 4,513,695 | 4/1985 | Patchen, II | 123/41.1 |
| 4,517,929 | 5/1985 | Musick et al. | 123/41.1 |
| 4,520,767 | 6/1985 | Roettgen et al. | 123/41.1 |
| 4,550,692 | 11/1985 | Crofts, Sr. | 123/41.1 |
| 4,621,594 | 11/1986 | Kubis | 123/41.09 |
| 4,697,551 | 10/1987 | Larsen et al. | 123/41.31 |
| 4,928,637 | 5/1990 | Naitoh et al. | 123/41.31 |
| 5,020,482 | 6/1991 | Deutschmann | 123/41.29 |
| 5,174,254 | 12/1992 | Humburg | 123/142.5 R |
| 5,201,285 | 4/1993 | McTaggart | 123/41.31 |
| 5,353,757 | 10/1994 | Susa et al. | 123/41.29 |
| 5,415,147 | 5/1995 | Nagle et al. | 123/563 |
| 5,497,734 | 3/1996 | Okada | 123/41.1 |
| 5,529,116 | 6/1996 | Sasaki et al. | 165/144 |
| 5,537,956 | 7/1996 | Rennfeld et al. | 123/41.29 |
| 5,598,705 | 2/1997 | Uzkan | 60/599 |
| 5,669,338 | 9/1997 | Pribble et al. | 123/41.29 |
| 5,910,099 | 6/1999 | Jordan, Jr. et al. | 60/599 |

FOREIGN PATENT DOCUMENTS

| | | |
|---|---|---|
| 0 054 792 | 6/1982 | European Pat. Off. . |
| 2 038 939 | 7/1980 | United Kingdom . |
| 2 057 564 | 4/1981 | United Kingdom . |

*Primary Examiner*—Henry C. Yuen
*Assistant Examiner*—Hai Huynh
*Attorney, Agent, or Firm*—John L. Rogitz

[57] ABSTRACT

An engine cooling system includes a two-pass radiator, a jacket water pump pumping coolant from the radiator to the engine, and an aftercooler for cooling engine charge air from a turbocharger. An aftercooler pump pumps coolant from the radiator to the aftercooler. An orifice can be disposed in the aftercooler discharge line to limit flow therethrough, and an orifice bypass line with thermostatic control valve can be provided to selectively bypass the orifice. A shunt tank is connected to the suction of the jacket water pump to establish a static pressure head thereon, to ensure that the jacket water pump has sufficient suction pressure despite relatively high coolant head loss through the two-pass radiator.

9 Claims, 1 Drawing Sheet

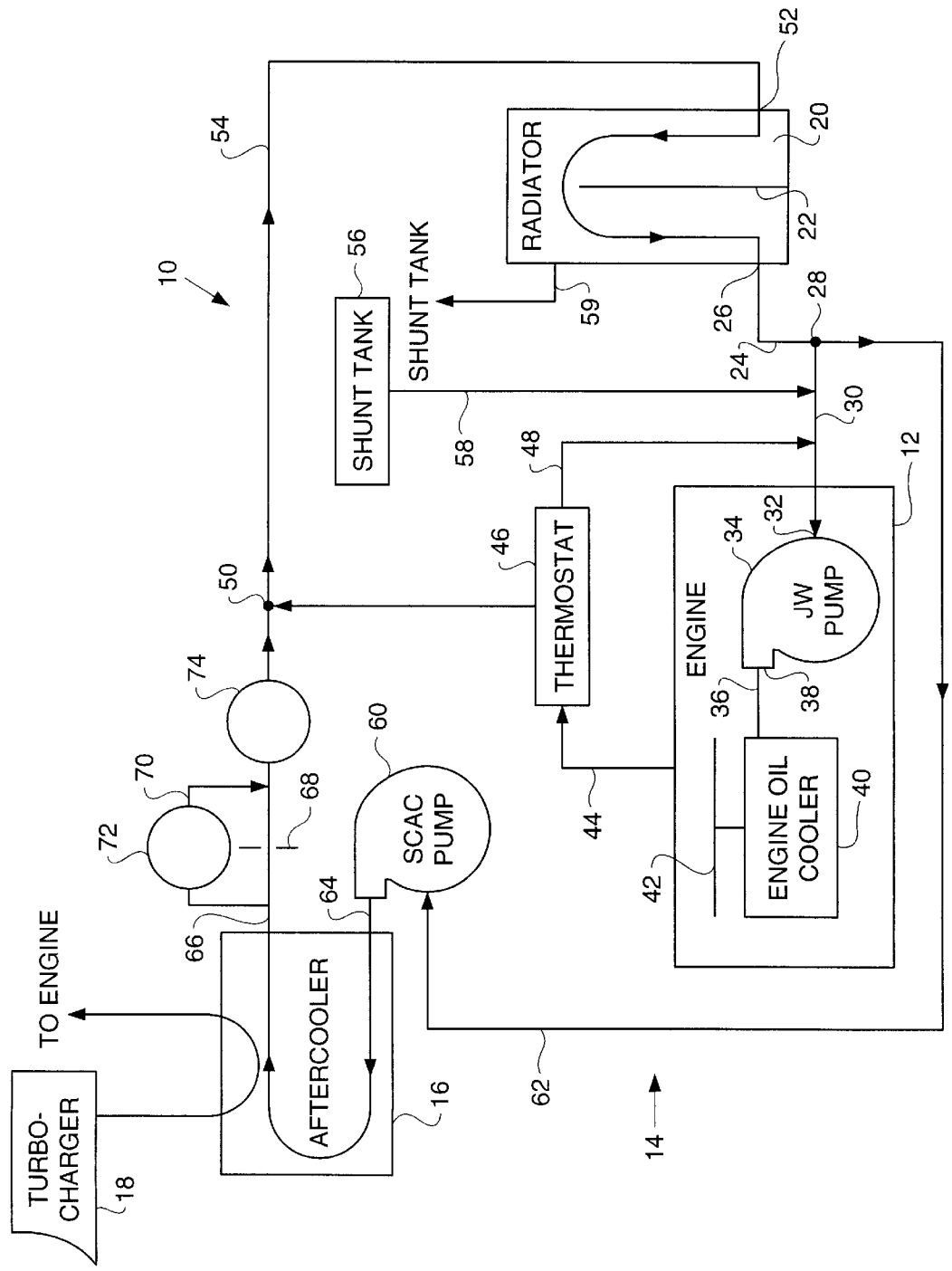

TURBOCHARGED ENGINE COOLING SYSTEM WITH TWO-PASS RADIATOR

TECHNICAL FIELD

The present invention relates generally to engine cooling systems, and more particularly to turbocharged engine cooling systems having aftercoolers.

BACKGROUND ART

The operation of heavy mechanical equipment such as large tractors generates considerable heat in the engines of the equipment, which must be efficiently dissipated to prevent damage to the engine. This is generally accomplished by coolant-based radiator systems, in which a pump circulates coolant through tubes in a radiator. Air cools the tubes and, hence, the coolant, and the coolant is then pumped through various engine components, e.g., an engine oil cooler, to cool these components.

As recognized herein, many engines of heavy equipment are turbocharged. Turbochargers generate pressurized charge air for the engine which is used in the combustion process. To reduce engine emissions, the temperature of the charge air from the turbocharger should be minimized, and aftercoolers have been provided for this purpose. Coolant from the radiator can be used to cool the turbocharged air passing through an aftercooler.

Thus, it is important to minimize coolant temperature at normal operating conditions, both to effectively cool engine components and to reduce emissions in turbocharged engines. As recognized herein, however, it is further important to provide appropriate coolant flow rates at light loads, i.e., when the engine generates relatively little heat. The present invention understands that both of these problems can be addressed in a manner that is superior to that provided by existing cooling systems.

DISCLOSURE OF THE INVENTION

A cooling system for an engine and an aftercooler that is associated with the engine includes a two-pass radiator, and an aftercooler configured for cooling engine charge air from a turbocharger. Moreover, the system includes a jacket water (JW) pump in fluid communication with the radiator. The JW pump pumps coolant from the radiator to the engine. A separate circuit aftercooling (SCAC) pump is in fluid communication with the radiator, and the SCAC pump pumps coolant from the radiator to the aftercooler.

In another aspect, an engine cooling system includes a radiator having one or more cores, a JW pump, and a shunt tank disposed above the JW pump in communication therewith to provide a static pressure head thereto. Also, the system includes an aftercooler and an SCAC pump. A coolant piping system connects the JW pump to the radiator and the SCAC pump to the aftercooler and radiator.

In still another aspect, a method for cooling an engine includes pumping coolant through a two-pass radiator to the engine, and returning the coolant to the radiator. The method further includes passing coolant from the radiator to an aftercooler to cool engine charge air from a turbocharger.

The details of the present invention, both as to its structure and operation, can best be understood in reference to the accompanying drawings, in which like reference numerals refer to like parts.

BRIEF DESCRIPTION OF THE DRAWINGS

The FIGURE is a schematic diagram of the present cooling system, with the direction of coolant flow through the system being indicated by arrows.

BEST MODE FOR CARRYING OUT THE INVENTION

Referring now to the FIGURE, a cooling system is shown, generally designated 10, for cooling an engine 12 of a vehicle, generally designated 14, and also for cooling a turbocharger aftercooler 16. In accordance with principles known in the art and as indicated in the FIGURE, the aftercooler 16 cools air from the turbocharger 18 prior to the air being drawn as charge air into the engine 14.

The system 10 includes a primary radiator 20 having tubes through which coolant flows, with the outside surfaces of the tubes being exposed to air to cool the coolant in the tubes. In the preferred embodiment, the radiator 20 is a two-pass radiator that can have multiple cores or cooling elements 22 (only one core or cooling element 22 shown). In a particularly preferred embodiment, the primary radiator 20 is a radiator marketed by the present assignee under the trademark "AMOCS". By "two-pass" is meant that coolant flowing through the radiator 20 passes across the cooling element 22 twice, as indicated in the FIGURE.

After being cooled in the primary radiator 20, coolant enters a coolant supply line 24 from an outlet 26 of the radiator 20, and the coolant flows to a coolant supply three-way junction 28. From the coolant supply three-way junction 28, the coolant flow is divided into two paths for fluid communication. The first path is established by a JW pump suction line 30, through which coolant flows to a suction port 32 of a centrifugal-type jacket water (JW) pump 34. The JW pump discharges coolant into a JW pump discharge line 36 through a JW pump discharge port 38, and the coolant then flows to an engine oil cooler 40 of the engine 12 and thence to other engine components 42, to cool the oil cooler 40 and components 42 in accordance with well-understood principles. The coolant then exits the engine 12 via an engine return line 44.

From the engine return line 44, the coolant flows to a thermostat 46 that directs coolant into both an engine recirculation line 48 and toward a coolant return three-way junction 50. As shown, the engine recirculation line 48 establishes a path for fluid communication directly back to the suction of the JW pump 34, whereas coolant passing through the coolant return three-way junction 50 enters a primary radiator inlet 52 via a coolant return 54. As the skilled artisan will recognize, the position of the thermostat 46 depends on the temperature of the coolant. At lower coolant temperatures, comparatively more coolant is passed through the recirculation line 48, while at higher coolant temperatures, most if not all coolant is directed back to the radiator 20 via the coolant return line 54.

As recognized by the present invention, coolant passing through a two-pass radiator can lose a significant amount of pressure head compared to the coolant head loss in a single-pass radiator, to the extent that the suction pressure of the associated JW pump can be unacceptably low. Accordingly, a shunt tank 56 is disposed above the suction port 32 of the JW pump 34 in fluid communication therewith via a static head line 58 and the JW pump suction line 30, to provide a static pressure head at the suction of the JW pump 34. If desired, the radiator 20 can vent to the shunt tank 56 via a vent line 59.

Turning to the aftercooler 16 cooling circuit, a centrifugal-type separate circuit aftercooler (SCAC) pump 60 is in fluid communication with the coolant supply three-way junction 28 via an SCAC pump suction line 62. The SCAC pump 60 discharges coolant into an aftercooler supply line 64 and thence to the aftercooler 16. Preferably, the aftercooler 16 is a two-pass aftercooler made by the present assignee.

Coolant exits the aftercooler 16 to an aftercooler return line 66. To limit coolant flow through the aftercooler 16, an orifice 68 preferably is disposed in the aftercooler return line 66. Optionally, the orifice can be bypassed by coolant when the coolant flows through an orifice bypass line 70, and flow through the orifice bypass line 70 can be regulated by an orifice bypass thermostatic control valve 72. Moreover, flow through the aftercooler return line 66 can be regulated by an aftercooler return thermostatic control valve 74 which is disposed in the return line 66. From the aftercooler return line 66, coolant flows to the coolant return three-way junction 50 and thence to the inlet 52 of the primary radiator 20.

Industrial Applicability

With the above disclosure in mind, to achieve low inlet coolant temperatures to the aftercooler 16 and, hence, to reduce emissions, total coolant flow to the radiator 20 is minimized by limiting aftercooler 16 coolant flow rate by means of the orifice 68 (configured to provide optimum coolant flow rate at normal operating conditions and ambient temperature), and by establishing an increased thermostat 46 setting. The above-disclosed two-pass radiator 20 facilitates these low coolant flow rates by providing high coolant flow velocity through its cooling tubes. Likewise, the above-disclosed two-pass aftercooler 16 provides relatively improved cooling of engine charge air at relatively low coolant flow rates.

At relatively high ambient temperatures and high loads, the thermostat 46 opens to port most if not all coolant flowing therethrough to the coolant return line 54. This in turn reduces coolant flow rate to the aftercooler 16; to counteract this, in the optional embodiment incorporating the orifice bypass thermostatic control valve 72, the orifice bypass thermostatic control valve 72 opens to allow coolant to bypass the orifice 68 and thereby increase coolant flow rate through the aftercooler 16. Also, the aftercooler return thermostatic control valve 74 is fully open at these conditions. On the other hand, during cooler ambient temperatures and relatively light engine loads, the thermostat 46 directs relatively more coolant into the recirculation line 48, and the aftercooler return thermostatic control valve 74 likewise throttles coolant flow through the aftercooler return line 66.

While the particular TURBOCHARGED ENGINE COOLING SYSTEM WITH TWO-PASS RADIATOR as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". Other aspects and advantages of this invention can be obtained from a study of the drawing, the disclosure, and the appended claims.

What is claimed is:

1. An engine cooling system, comprising:

at least one radiator having one or more cores;

at least one JW pump;

at least one shunt tank disposed above the JW pump in communication therewith to provide a static pressure head thereto;

at least one aftercooler;

at least one SCAC pump; and a coolant piping system connecting the JW pump to the radiator and connecting the SCAC pump to the aftercooler and radiator, the piping system including a coolant supply line leading from the radiator to a three-way junction, both pumps taking a suction on the junction.

2. The system of claim 1, wherein the aftercooler cools engine charge air from a turbocharger.

3. The system of claim 2, wherein the radiator is a two-pass radiator.

4. The system of claim 3, further comprising:

at least one aftercooler coolant line in fluid communication with the aftercooler; and at least one orifice disposed in the aftercooler coolant line to limit fluid flow therethrough.

5. The system of claim 4, further comprising:

at least one orifice bypass line in fluid communication with the aftercooler and the radiator; and at least one valve in the orifice bypass line.

6. The system of claim 5, further comprising at least one thermostatic control valve disposed in the aftercooler coolant line.

7. The system of claim 1, wherein the radiator vents to the shunt tank.

8. The system of claim 1, in combination with an engine.

9. The combination of claim 8, in further combination with a vehicle such as a tractor.

* * * * *